Dec. 27, 1955 J. M. MORGAN 2,728,874
CATHODE RAY BEAM DEFLECTION CIRCUITS
Filed Dec. 9, 1952
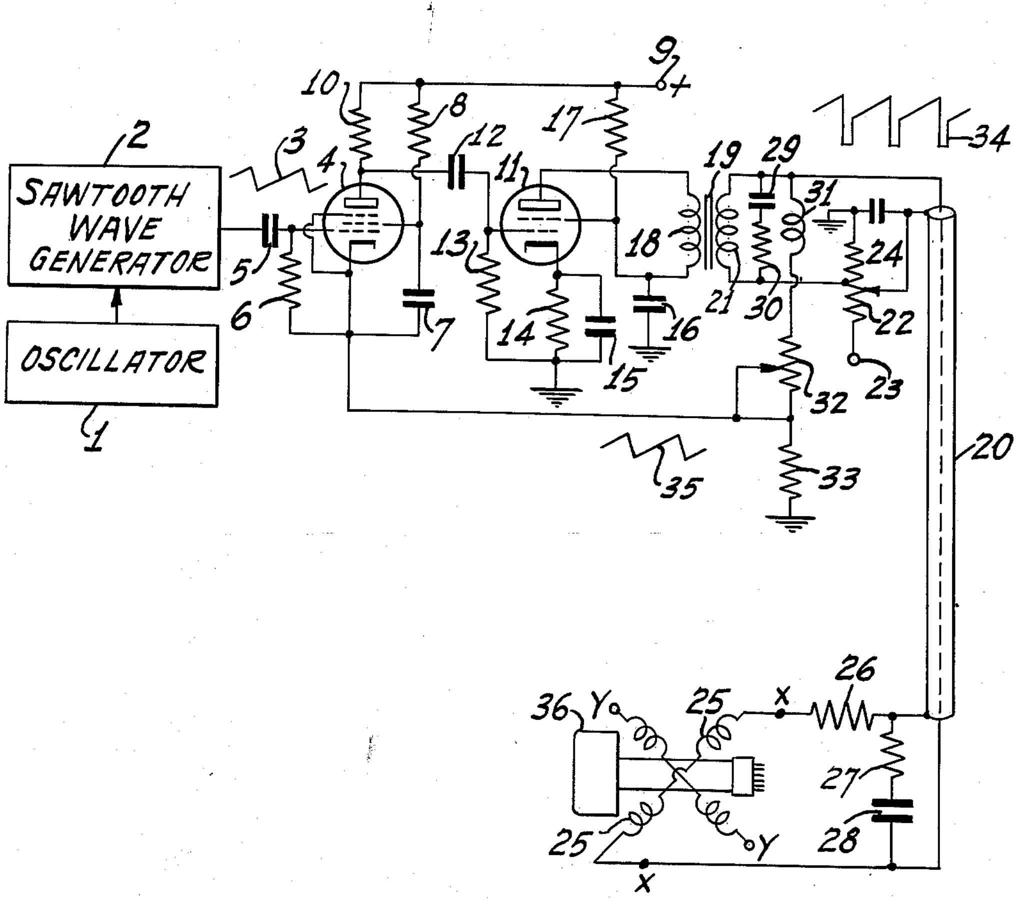
INVENTOR.
JEREMIAH M. MORGAN
BY [signature]
ATTORNEY United States Patent Office 2,728,874

Patented Dec. 27, 1955

2,728,874

CATHODE RAY BEAM DEFLECTION CIRCUITS

Jeremiah Morris Morgan, Cranbury, N. J., assignor to Radio Corporation of America, a corporation of Delaware Application December 9, 1952, Serial No. 324,981

7 Claims. (Cl. 315—27)

The present invention relates to apparatus for generating waves for the deflection of an electron beam in a cathode ray tube, and more particularly to the generation of suitable deflection waves for transmission to a remote television pickup device employing electromagnetic deflection of a cathode ray beam.

In order to minimize the complexity and bulk of television pickup devices and their immediately associated equipment, suitable waves for deflecting an electron beam in a television pickup device may be generated remotely from the pickup device and transmitted thereto by a suitable transmission line, such as, for example, a coaxial cable. A coaxial cable for transmitting deflection waves is preferably terminated in its characteristic impedance by means of an impedance matching network connected to the windings of the deflection yoke associated with the pickup device. This impedance matching network may consist of suitable components to form a constant impedance network in combination with the parameters of the windings of the deflection yoke. As is well known, a constant impedance network presents a substantially resistive load to a transmission line. In the generation of suitable waveforms for transmission by means of a coaxial line terminated in its characteristic impedance, it is necessary to mix the proper amount of pulse wave to a sawtooth wave (commonly called a peaked sawtooth wave). The pulse is essential to cause the current, flowing through the inductance of the yoke, to reverse fast enough to accomplish the proper return time for the sawtooth waveform. The pulse component may be separately generated and suitable portions added to the sawtooth deflection wave to achieve linearity of deflection at the pickup device; manual adjustment and inspection being used to determine the characteristic of the added portions. A system for generation and the transmission of deflection waves by means of a coaxial cable terminated in its characteristic impedance is well shown and described in the United States Patent 2,559,525, entitled "Cathode-Ray Deflection Circuits," by Arthur W. Vance, filed December 31, 1949.

It is an object of this invention to provide improved means for remotely generating a suitable deflection waveform for transmission to a remote location by means of a transmission line terminated in its characteristic impedance.

It is another object of the present invention to provide means for remotely generating deflection waves which are automatically compensated to adjust for nonlinearities in the transmission of said deflection waves to a remotely located device.

According to this invention, a sawtooth shaped wave of voltage from a suitable low impedance source is applied to the input of an amplifier; the output of the amplifier is connected to a correctly terminated transmission line; and a suitably proportioned network for providing a substantially sawtooth shaped voltage wave is connected across the output of the amplifier and inverse feedback means are used to apply the sawtooth shaped voltage wave to the input of the above mentioned amplifier.

Other and incidental objects of this invention will become apparent upon a reading of the following specification and an inspection of the drawing in which the single figure of the drawing shows a deflection system of a television image pickup system including an illustrative embodiment of the present invention.

Turning to the drawing in detail, there is illustrated by the block 1 an oscillator capable of producing a timing signal at its output, such as, for example, a relaxation oscillator, a multivibrator, or a sine wave oscillator. The output of the oscillator 1 synchronizes the sawtooth deflection wave generator 2 to provide a sawtooth shaped wave 3 which is applied to the control electrode of the amplifying electron tube 4 by means of a coupling capacitance 5. A suitable grid leak resistance 6 is connected between the control electrode of electron tube 4 and the cathode of electron tube 4. The screen grid of electron tube 4 is coupled to the cathode by a bypass capacitance 7 and is connected to a suitable source of positive potential by means of a resistance 8 connected to a terminal 9. The suppressor grid of electron tube 4 may be connected directly to the cathode as shown.

The anode of electron tube 4 secures its positive operating potential by means of a resistance 10 connected to terminal 9. The amplified sawtooth voltage wave appearing at the anode of electron tube 4 is coupled to the control electrode of the current amplifying electron tube 11 by a coupling capacitance 12. A grid leak resistance 13 is connected between the control electrode of electron tube 11 and ground reference potential.

Electron tube 11 is self biased by means of the parallel combination of resistance 14 and capacitance 15 connected between the cathode of electron tube 11 and ground reference potential. The output circuit of electron tube 11 includes the primary winding 18 of a transformer 19 connected between the anode and the screen grid of electron tube 11. The end of the winding 18 connected to the screen grid is bypassed to ground by means of capacitance 16, and a positive operating potential may be applied to both the screen grid and anode by means of a resistance 17 connected to the terminal 9. The transformer 19 is a step-down type of transformer which is adapted to provide a current amplification and thereby a suitable low impedance source for energizing the transmission line 20. The end of the secondary winding 21 of transformer 19 that is in phase with the anode of tube 11 is connected directly to the inner conductor of transmission line 20, while the other end of the secondary winding 21 is connected to the fixed center tap of the potentiometer 22. Potentiometer 22 is connected between ground reference potential and terminal 23, to which may be applied a suitable source of voltage. By adjustment of the variable tap on potentiometer 22, a suitable direct voltage is applied to the outside conductor of transmission line 20 for purposes of centering the scanning at the light image pickup device 36. A capacitance 24 establishes the outside conductor of transmission line 20 at A.-C. ground reference potential.

Considering the circuitry associated with the light image pickup device 36, it will be seen that a network having two branches is connected between the outside conductor and inner conductor of the transmission line 20. The first branch comprises the windings of the deflection yoke 25 associated with the light image pickup device 36 and a resistance 26. The second branch comprises a resistance 27 connected in series with a capacitance 28. Although other termination networks might be employed without departing from the present invention, the one shown commonly known as a constant impedance network, is simple and efficient. Neglecting the internal resistance of windings 25 and designating windings 25 as $L_2$, the capacitance 28 as $C_2$, the resistance 26 as $R_2$ and the resistance 27 as $R_3$, the following relationships provide suitable circuit values. Where Z equals the characteristic impedance of the coaxial line 20, $$Z=\sqrt{\frac{L_2}{C_2}}$$

and $$Z=R_2=R_3$$

All values being given in ohms.

Where a transmission line having a characteristic impedance of 52 ohms is employed, and where the inductance of the deflection windings $L_2=1$ millihenry, $C_2=.37$ microfarad, and $R_2$ and $R_3=52$ ohms.

In accordance with the present invention, an impedance network similar to the one associated with light image pickup device 36 is included in the input circuit of transmission line 20. This impedance network includes two branches; the first including capacitance 29 and resistance 30 which are connected across secondary winding 21, and a second branch comprising inductance 31, resistances 32 and 33 which are connected serially between the in phase end of secondary winding 21 and ground reference potential. The second branch, however, may be considered to be connected directly across secondary winding 21 because the impedance of capacitance 24 and potentiometer 22 is small compared to the values of resistances 32 and 33. By proportioning the relative values of capacitance 29 and inductance 31, in combination with resistances 30, 32, and 33 to form a constant impedance network of relatively high impedance, the voltage appearing at the connection between resistances 32 and 33 will be similar in wave shape to that appearing across resistance 26, and hence the wave shape of the current flowing through windings 25. This is true since both the impedance network associated with light image pickup device 36 and the impedance network associated with the input circuit of transmission line 20 presents a purely resistive load. Further, since the elements of two impedance networks are proportioned to have the same relative values to one another, the wave shape appearing in corresponding portions therein will be similar. By connecting the junction between resistances 32 and 33 to the cathode of electron tube 4, an inverse feedback path is established. The inverse feedback voltage tends to make the waveform appearing at the junction between resistances 32 and 33 the same as the sawtooth wave 3 applied to the control electrode of electron tube 4. The variable resistor 32 is provided so that the total value of resistor 32 plus resistor 33 will be controllable above and below the theoretical value required for constant impedance networks. This provides a control of linearity of scan of tube 36 (the sawtooth shaped voltage wave across resistor 26 will bow up or down, as desired, when resistor 32 is varied). Since the wave shape at the junction of resistances 32 and 33 is similar to that produced across resistance 26, the application of this wave by inverse feedback will tend to provide a current wave through windings 25 which is of the same wave shape as the sawtooth wave 3. Under one condition of operation, this results in a wave resembling that shown at 34 being applied to the input of transmission line 20 and a substantially sawtooth shaped wave 35 being fed back from the junction of resistances 32 and 33 to the cathode of electron tube 4.

The circuit values of the impedance network associated with the input circuit of transmission line 20 may be obtained by means of the formulas given for constant impedance networks above. A suitable value of constant impedance should be chosen however, so as not to unduly load the secondary 21. Designating resistance 30 as $R_1$ and the total of resistances 32 and 33 as $R_4$, capacitance 29 as $C_1$, and inductance 31 as $L_1$, and with the chosen impedance Z equalling 1,000 ohms, $$Z=\sqrt{\frac{L_1}{C_1}}=1{,}000 \text{ ohms}$$

In order to establish the similar relationship between the impedance network connected to the input of transmission line 20 and the impedance network associated with the image pickup device 36, $$L_1=\frac{Z_1}{Z_2}=\frac{10^3}{52}=19\cdot 2 \text{ millihenrys}$$

and $$C_1=\frac{C_2}{L_1}=\frac{.37}{19.2}=.0185 \text{ microfarad}$$

It will be noted that the value of $C_1$, that is capacitance 29, is relatively small; and since this is so, capacitance 29 and resistance 30 might be omitted for a simplified alternative embodiment.

Although various embodiments of the present invention might include various circuit values, the following component values actually employed in a satisfactory embodiment are given by way of example only.

| | |
|---|---|
| Capacitance **5** | .01 microfarad |
| Resistance **6** | 1 megohm |
| Capacitance **7** | 1 microfarad |
| Resistance **8** | 82,000 ohms |
| Resistance **10** | 27,000 ohms |
| Capacitance **12** | .05 microfarad |
| Resistance **13** | 100,000 ohms |
| Resistance **14** | 150 ohms |
| Capacitance **15** | .002 microfarad |
| Capacitance **16** | 10 microfarads |
| Resistance **17** | 2,000 ohms |
| Transformer **19** | 4 to 1 turns ratio |
| Transmission line **20** | 52 ohms coaxial line |

Having thus described the invention, what is claimed is:

1. In a cathode ray beam deflection system, the combination of, a source of deflection waves, amplifying means coupled to said source, signal transmission means coupled to said amplifying means, an output circuit including a constant impedance network coupled to the far end of said transmission means, said constant impedance network having an impedance substantially equal to the characteristic impedance of said transmission means, an input circuit including another constant impedance network coupled to said transmission means, and an inverse feedback path connected between said input circuit constant impedance network and said amplifying means.

2. In a cathode ray beam deflection system including a source of deflection waves and a deflection winding, the combination of, deflection wave amplifying means coupled to said source of deflection waves, a transmission line, a termination network, means coupling said transmission line between said amplifying means and said termination network, means coupling said termination network to said deflection winding to form a first constant impedance network having an impedance equal to the characteristic impedance of said transmission line, a second constant impedance network coupled to the input of said transmission line, and an inverse feedback connection between said second constant impedance network and said deflection wave amplifying means.

3. In a system for generating deflection waves to be impressed upon a deflection winding of a cathode ray tube, the combination of, a source of periodically recurring waves, a first amplifying means having an input circuit coupled to said source of waves, said first amplifying means also having an output circuit, a second amplifying means having an input circuit coupled to the output circuit of said first amplifying means, said second amplifying means also having an output circuit, a constant impedance network coupled to the output circuit of said second amplifying means, said constant impedance network having characteristics similar to said deflection winding, and an inverse feedback connection between said constant impedance network and the input circuit of said first amplifying means.

4. In a deflection wave generating system for supplying deflection waves to a utilization device located at a distance from said generating system by means of a transmission line terminated in the characteristic impedance thereof by a circuit comprising said utilization device and a resistance element connected in series across the remote terminals of said transmission lines and a resistance component and a capacitance component connected in series across said remote terminals of said transmission lines, an amplifying circuit having an input to which said deflection waves are applied and an output coupled to the local terminals of said transmission line, a constant impedance network shunted across said output and having characteristics similar to those of said circuit terminating said transmission line, and an inverse feedback connection from a point on said network corresponding to said resistance element and said input of the amplifying circuit.

5. In a deflection wave generating system for supplying deflection waves to a utilization device located at a distance from said generating system by means of a transmission line terminated in the characteristic impedance thereof by a circuit comprising said utilization device and a resistance element connected in series across the remote terminals of said transmission line and a resistance component and a capacitance component connected in series across said remote terminals of said transmission line, an amplifying circuit having an input to which said deflection waves are applied and an output coupled to the local terminals of said transmission line, a constant impedance network said network comprising a component having reactance corresponding to that of said utilization device and a resistance element connected in series across said output and resistance and capacitance components shunted across said output having characteristics similar to those of said circuit terminating said transmission line and an inverse feedback connection from a point on said resistive element and said input of the amplifying circuit.

6. In a cathode ray beam deflection system including a source of periodically recurring waves the combination of, an amplifying means having an input circuit and an output circuit, means coupling said source of waves to said input circuit, a termination network comprising a first branch and a second branch, said first branch including a capacitance and a resistance connected serially, said second branch comprising a deflection coil and a resistance connected serially, a transmission line coupled between the output circuit of said amplifying means and said termination network, the values of said capacitance and said deflection coil satisfying the following relationship with respect to the characteristic impedance of said transmission line, where $L_2$ is the inductance of said deflection coil in henrys, $C_2$ is the value of said capacitance in farads, and Z is the characteristic impedance of said transmission line in ohms, $$Z=\sqrt{\frac{L_2}{C_2}}$$

a constant impedance network coupled to the output circuit of said amplifying means, and an inverse feedback connection between said constant impedance network and the input circuit of said amplifying means.

7. In a cathode ray beam deflection system including a source of periodically recurring waves the combination of, amplifying means having an input circuit and an output circuit, means coupling said input circuit to said source of deflection waves, a first constant impedance network connected across the output circuit of said amplifying means, said first constant impedance network including two branches, said first branch comprising a capacitance and a resistance connected serially, said second branch comprising an inductance and a resistance connected serially, a second constant impedance network comprising two series combinations connected in parallel, said first series combination including a deflection coil and a resistance, said second series combination including a capacitance and a resistance, a transmission line coupling the output circuit of said amplifying means to said second constant impedance network, the values of said first constant impedance network and said second constant impedance network satisfying the following relationships with respect to the characteristic impedance of said transmission line where said first constant impedance network capacitance is designated $C_1$, the resistance connected serially therewith is designated $R_1$, said first constant impedance network inductance is designated $L_1$, and the resistance connected serially therewith is designated $R_4$, said second constant impedance capacitance is designated $C_2$, the resistance connected serially therewith is designated $R_3$, the inductance of said second constant impedance network deflection coil is designated $L_2$, the resistance connected therewith $R_2$, the characteristic impedance of said transmission line is designated Z, and where K may be any desired constant, $$Z=\sqrt{\frac{L_2}{C_2}}$$

$$Z=R_2=R_3$$

$$R_1=R_4=kZ$$

$$kZ=\sqrt{\frac{L_1}{C_1}}$$

$$kL_1=L_2$$

References Cited in the file of this patent

UNITED STATES PATENTS

| | | |
|---|---|---|
| 2,230,819 | White | Feb. 4, 1941 |
| 2,247,538 | Wheeler | July 1, 1941 |
| 2,251,851 | Moore | Aug. 5, 1941 |
| 2,299,571 | Dome | Oct. 20, 1942 |
| 2,547,213 | Johnson et al. | Apr. 3, 1951 |
| 2,559,525 | Vance | July 3, 1951 |
| 2,594,841 | Arndt, Jr. | Apr. 29, 1952 |
| 2,623,996 | Gray | Dec. 30, 1952 |
| 2,634,335 | Stolaroff | Apr. 7, 1953 |

OTHER REFERENCES

Terman Text, "Radio Engineering," 3rd ed., pages 319–325, pub. 1947 by McGraw-Hill Book Co., N. Y.